W. BRADFORD.
BEAN HARVESTER.
No. 180,455. Patented Aug. 1, 1876.
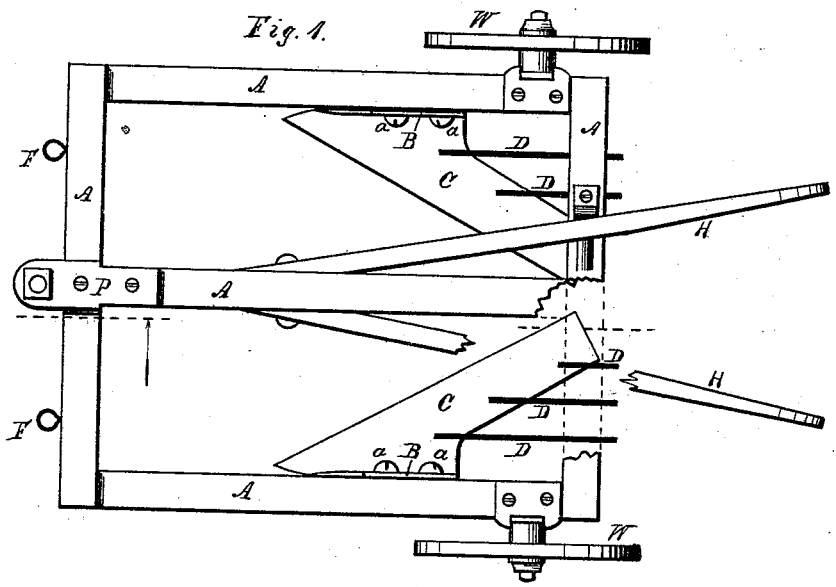
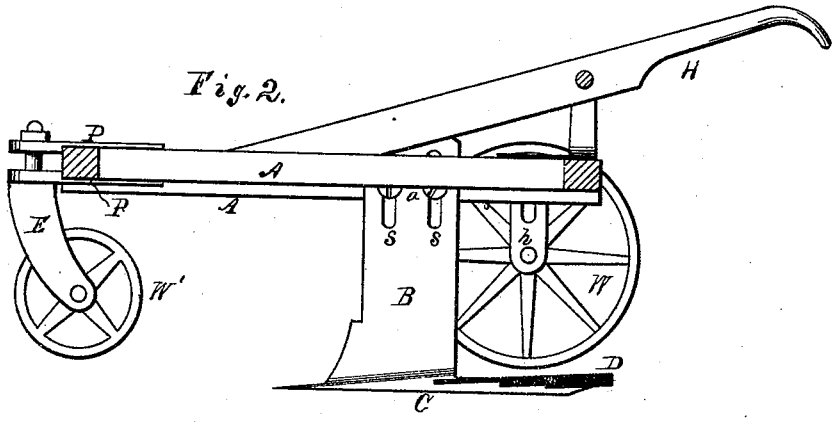
Witnesses:
E. B. Whitmore
J. K. Hopper
Inventor:
Wm. Bradford
By Hinds Loughborough
Atty

UNITED STATES PATENT OFFICE

WILLIAM BRADFORD, OF BROCKPORT, NEW YORK.

IMPROVEMENT IN BEAN-HARVESTERS.

Specification forming part of Letters Patent No. 180,455, dated August 1, 1876; application filed September 30, 1875.

*To all whom it may concern:*

Be it known that I, WILLIAM BRADFORD, of Brockport, in the county of Monroe and State of New York, have invented certain new and useful Improvements in Machines for Harvesting Beans; and I do hereby declare that the following is a full, clear, and exact description thereof, reference being had to the accompanying drawings, making part of this specification, in which—

Figure 1 is a sectional plan view of my invention. Fig. 2 is a central sectional elevation.

All of the various devices for harvesting beans by machinery have been found more or less objectionable in practice, either in the methods of operation, or in the condition in which the crop would be left by the machine. The object of this invention is to remove these objections, which is fully accomplished and a simple and cheap machine provided. It consists, mainly, in the employment of cutter-blades, so hung upon a frame mounted on carrier-wheels that the bean-stalks may be cut off at any desired depth below the surface, and only partially lifted out, where they are permitted to stand and partially "cure" or dry, after which they are very readily removed with a fork by hand, and turned over upon their tops, to lie until thoroughly cured, and ready to be collected.

I prefer a rectangular frame, A, provided with suitable handles H and a hinged tongue, connected at F, said frame mounted upon two carrier-wheels, W, and a central caster-wheel, W', in front. The latter may have its yoke E pivoted to the frame by means of the plates P. The hangers $h$ of the carrier-wheel W should be adjustably attached to the frame, to permit the frame to be raised or lowered, as may be desired.

The cutter-blades C are made of sheet-steel, and may be formed, as shown, with a shank, B, to be connected to the side bars of the frame A; or the cutters may be made separate from the hanger-shanks, if desired. The upper end of the shanks may be provided with one or more slots, $s$, through which suitable bolts $a$ pass, the slots permitting the cutters to be raised or lowered to any desired extent.

The blades should be formed and hung about as shown, so as to have their cutting-edge in about the same horizontal plane from point to heel, but having their rear edge somewhat elevated, whereby their upper face shall be somewhat inclined.

To the rear edge of the cutters I fix several straight fingers, D, on about the same inclination as that of the upper face of the cutters. The cutters are made in pairs, and preferably so as to slope backward toward each other, leaving a narrow space between the rear end of their cutting-edges, as shown in Fig. 1, for clearance.

When the machine is constructed as shown and described it is intended to cut two rows of beans at a time, and, while doing so, to work them toward the center, or into one windrow, for convenience in gathering. The cutters are set so as to travel about four or five inches, more or less, below the surface of the ground. The bean-stalks are cut off or separated from the roots, and, as the machine moves forward, the inclination of the cutters and the fingers D tends to lift the stalks more or less; but it is not desired to entirely throw them out of the ground. They are left in this position for a time to dry or cure, which process goes on quite rapidly after being cut from the roots. When this has progressed sufficiently they are easily turned over with a suitable fork, in which inverted position they are allowed a further time to dry before being collected.

Of course a single cutter might be used, and one row|cut at a time; but I prefer to employ two, and to arrange them as shown, instead of so as to slope rearward from each other, which latter arrangement would tend to turn the two rows being operated upon by the machine from each other.

I do not claim specifically any of the devices shown in the Patent No. 127,931, dated April 15, 1873; but            /37931/

What I claim as my invention is—

As an improvement in bean-harvesting machines, the cutter-blades C, made vertically adjustable upon the frame, and sloping backward toward each other, leaving a space between their inner ends, as shown and described, and provided with fingers D, fixed thereto in a slightly-inclined position, all the parts being constructed and arranged to operate conjointly, in the manner and for the purposes set forth.

Witnesses:            WM. BRADFORD.
  WM. S. LOUGHBOROUGH,
  B. C. WILLIAMS.